April 8, 1969   J. D. KRANTZ   3,436,983
LATCH STRUCTURE FOR PULL LINES
Filed Aug. 8, 1967
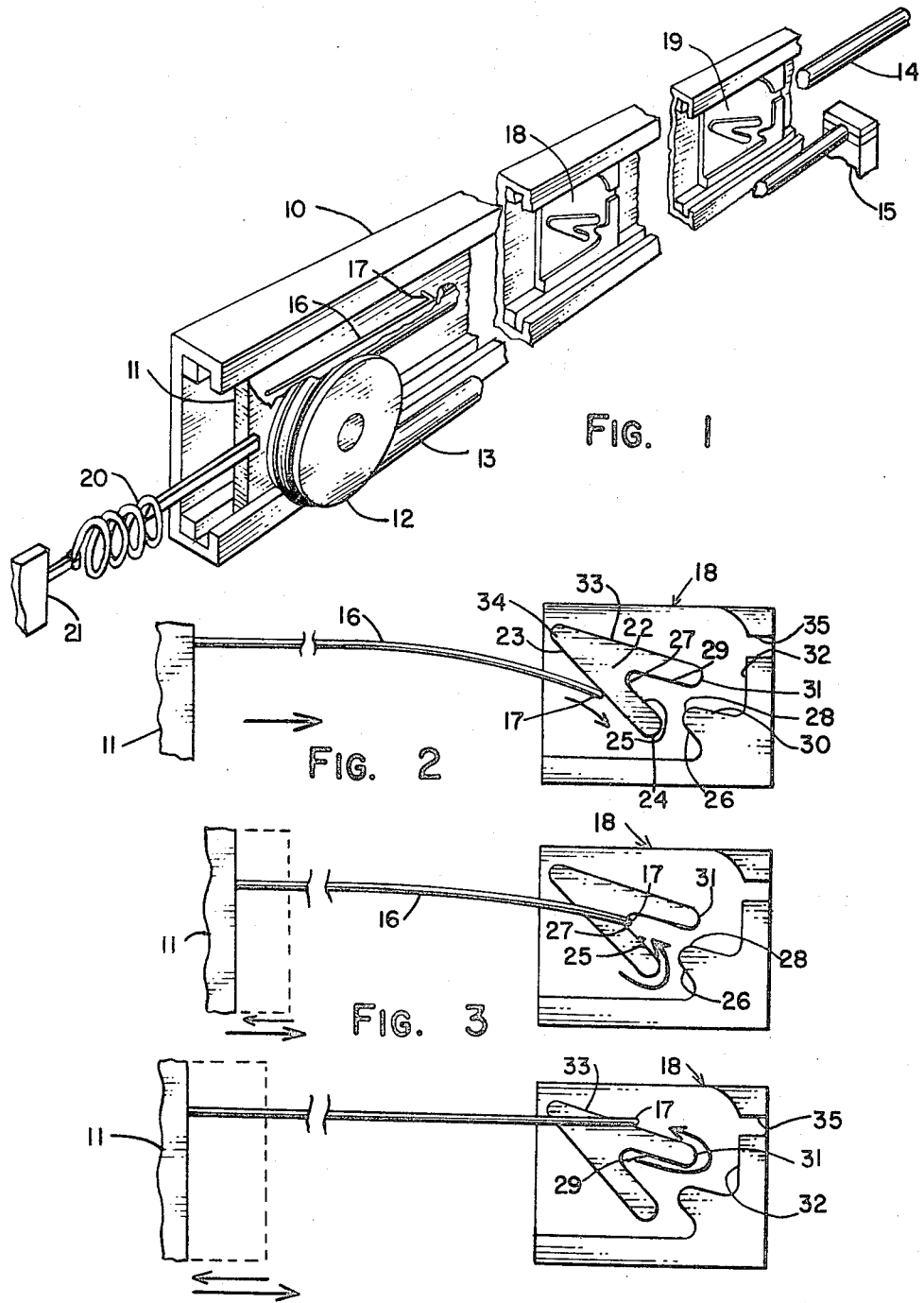
INVENTOR.
JOHN D. KRANTZ
BY
*Elliott & Pastoriza*
ATTORNEYS United States Patent Office 3,436,983
Patented Apr. 8, 1969

3,436,983
LATCH STRUCTURE FOR PULL LINES
John D. Krantz, Inglewood, Calif., assignor to Coastal Dynamics Corporation, a corporation of California
Filed Aug. 8, 1967, Ser. No. 659,172
Int. Cl. G05g 5/06
U.S. Cl. 74—527                                    5 Claims

ABSTRACT OF THE DISCLOSURE

This disclosure relates to a latch structure for latching a line pulled from a console unit in a given extended position. The line may be a tube or hose used in a dental console terminating in a nozzle structure, suction device, or other instrument which may be pulled from the console. The latch structure comprises a tilted V-shaped member positioned along a track within the console with its outer apex facing a cooperating hook element which moves along the track when the line is withdrawn. The arrangement is such that the hook element engages one arm of the V and rides downwardly over the end of the arm. Relaxing of the tension on the line permits the hook element to engage the inner vertex of the V and thus the line is latched to its extended position. Pulling on the line will then cause the hook element to ride over the end of the other arm of the V to be free of the inner vertex and thus in a position to be retracted into the console by a suitable biasing means. The invention contemplates a series of such latch members positioned along the track so that the line may be extended and latched at various positions.

---

This invention relates generally to latch structures and more particularly to a novel latching device particularly to a novel latching device particularly useful in dental console units for latching a hose line in a given withdrawn position from the console.

In modern dental equipment, it is desirable for a dentist to be able to withdraw a line from a console unit a desired distance for use with a patient. Normally, such lines are biased by suitable spring means for retraction into the console unit so that when the dentist is through using the instrument, the line or hose will be automatically retracted. A similar situation exists in the case of gasoline filling stations with air hoses and the like wherein it is desirable to have a given length of hose extend from a concealed container and when the operator is through with the hose, have the hose automatically retracted.

In many instances, a simple retracting spring or weights may be employed for the hose or line. In this case however there is always experienced by the operator or user a tension on the line which may interfere with his proper use of the instrument at the end of the line. This problem has been solved heretofore by providing a suitable ratchet or push catch type mechanism which will anchor the hose in an extended position. Some of these devices operate on the same principle as a window shade which will be retained in a downwardly drawn position and yet may be released by a simple pull on the end of the shade for returning to its retracted or stored position.

It is a primary object of the present invention to provide a novel latch mechanism performing the foregoing functions in a more positive and reliable manner and with considerably less hardware or interacting components than have been required heretofore, all to the end that an economical latching means is provided.

More particularly, it is an object to provide a latch structure particularly useful for dental consoles to latch a line or hose withdrawn from the console to a given extended position.

Still another object is to provide a device meeting the foregoing objects wherein a series of such catches may be provided to enable latching of a line withdrawn from a dental console at various given distances and wherein the line may be completely retracted from any one position by a simple pull on the line and then a relaxing of the tension on the line.

Briefly, these and other objects and advantages of this invention are attained by providing a hook element coupled to the line for movement along a given path defined by the direction in which the line is to be pulled. A catch member in turn is positioned along this path and takes the form of an integral V-shaped element tilted with respect to the path such that the outer apex of the V faces generally the hook element. A suitable spring means normally biases the hook element and line in an opposite direction so that pulling on the line moves the hook element towards the catch member against the bias of the spring.

The positioning of the catch member is such that the hook element will engage one arm of the V shape and ride over the end of this arm such that relaxing of the line after being drawn to position the hook element as described, results in the hook element being received in the internal vertex of the V shape. The line and hook element are thus held to the withdrawn position. A further pull on the line will then cause the hook element to ride over the end of the other arm of the V to free itself from the vertex such that subsequent relaxing on the line will permit the biasing means to retract the hook element and line to its fully retracted position.

Additional catch members identical to the first-mentioned catch member may be distributed along the path so that the line may be latched at several given extended positions.

A better understanding of the invention will be had by now referring to a preferred embodiment thereof as illustrated in the accompanying drawings, in which:

FIGURE 1 is a fragmentary schematic perspective view of a latch structure for pull lines in accord with the present invention;

FIGURE 2 is a side elevational view illustrating the relative positions of the various components preparatory to latching of the line of FIGURE 1 in a given position;

FIGURE 3 illustrates the relative positions after latching is complete; and,

FIGURE 4 illustrates the relative positions prior to retraction of the line back to its initial position.

Referring first to FIGURE 1, there is illustrated an elongated track means 10 which may form part of the internal construction of a dental console. This track means 10 defines a path for a guide means in the form of a block 11 supporting a pulley or wheel 12.

As shown in FIGURE 1, a line 13, which may be in the form of a hose, passes over the pulley 12 and extends forwardly to define a free end 14 which may protrude from the face of a console and be fitted with a suitable end instrument such as a suction device, nozzle, or air powered drill. The other end of the hose is anchored to a stationary structure 15 also adjacent the front end of the track.

The guide block 11 supports a hook element 16 having a free bent end 17 visible in the broken away portion of the block 11. This hook element is arranged to cooperate with a latch structure designated generally by the numeral 18 positioned along the track 10. Additional latch structures such as 19 may also be positioned along the track as shown. The guide block 11, hook element 16, and pulley 12 are all biased towards the rear of the track by a spring 20 secured at one end to the guide block 11 and at its other end to a stationary rear mount 21.

With the foregoing arrangement, it will be evident that pulling on the front of the free end of the line 14 will result in the pulley rotating and being guided by the guide block 11 along a path defined by the track 10. Because of the looping of the line about the pulley, the pulley, guide block 11, and hook element 16 will only move half of the distance that the line 14 is pulled from the front of the console. Thus, the total extent of line pulled from the console may be of a length approximately twice the length of the track so that the track may readily be accommodated in a compact unit and still enable a relatively long length of line to be employed.

Referring now to FIGURE 2, details of the latch structure 18 will be described. As shown, the latch structure takes the form of a general V-shaped member 22 tilted with respect to the path of travel of the hook element 16 such that the bent end 17 of the hook element will initially engage a first under sloping surface 23 defining an exterior portion of one arm of the V. The lower end of this one arm is indicated at 24 and merges into a first upwardly sloping inner surface 25. An additional smaller V-shaped projection defines an opposing upward surface 26 to define more or less of a channel structure for guiding the bent end 17 of the hook element 16. The inner vertex of the V member 22 is designated 27 and this is opposed by the outer apex 28 of the smaller additional V or projection portion of the member.

The vertex 27 merges into a second downwardly sloping surface 29 of less slope than the downwardly sloping surface 23, the latter downwardly sloping surface defining the inner portion of the other arm of the V shape 22. This second downwardly sloping surface 29 cooperates with an opposing surface 30 on the smaller V structure to again define a guiding channel for the bent end 17 of the hook element 16. The end of the other arm of the V shape 22 is designated 31 and is opposed by an end wall 32. The structure is completed by a return surface 33 constituting the exterior surface of the other arm of the V 22 which extends up to the outer apex 34 of the V shape. The end wall 32 of the structure includes an opening 35 at a level in line with the path of travel of the hook element 16 when in its straight cantilevered position.

With the foregoing description of the tilted V-shaped catch member and cooperating surface portions of the latch 18 as described in FIGURE 2 in mind, the operation of the latch will now be described.

In its free position, the hook element 16 is cantilevered and extends in the direction of the path of travel. As the line 14 is pulled, the pulley 12 will rotate and move the line 14 is pulled, the pulley 12 will rotate and move the guide block 11 and hook element 16 towards the first catch member 18 all as described in FIGURE 1. The positioning of the catch member is such that the initial engagement of the free bent end 17 of the cantilevered hook element 16 will engage the first under sloping surface of one arm of the V at a point intermediate the outer apex 34 of the V and the end 24 of the one arm. In addition, this point of engagement will be above the level of the end 31 of the other arm of the V. As a consequence of this positioning of the V, the bent end 17 of the hook element will ride down the first under sloping surface 23 around the end 24 of the one arm into the vertex 27 of the V shape and thus will be hooked in this vertex and hold the line 14 to its pulled position, all as shown in FIGURE 3. In this respect, the operator will know when the free end of the hook element has passed the end 24 because of the guiding opposing V surface 26 which will serve to act as a stop for the element so that the operator must relax his pulling force thus permitting the hook element to be received in the vertex 27.

The operator may then use the instrument on the end of the line without any tension being exerted on the line because of the latched relationship. When the operator wishes to retract the instrument, he need only pull on the line which will then cause the bent end 17 to ride down the second sloping surface 29 and around the end 31 of the other arm of the V to thus be free of the vertex of the V. This latter situation is depicted by the arrow in FIGURE 4 and in the particular position shown, it will be noted that the unstrained position of the hook element is in exact alignment with the end opening 35 in the end wall 32.

The operator may now continue to relax tension on the line so that the spring 20 of FIGURE 1 will return the hook element to its completely retracted position. Alternatively, the operator may again pull on the line thereby causing the free bent end 17 of the hook element to pass through the opening 35 and engage the next catch member 19 as shown in FIGURE 1 thereby permitting the line to be latched after it has been extended a greater distance.

The latch structure 19 operates in the same manner as the latch structure 18 and it will be evident that when the operator releases the hook element from the last latch structure such as 19 in FIGURE 1, the bent end portion 17 is free to ride over any preceding latch members along the upwardly sloping return surface such as 33 for the latch 18. Thus, the line may be completely retracted without any intermediate stops. On the other hand, to extend the line to its fullest latched condition, it is necessary that the structure be latched at each intermediate latch mechanism in order to position the hook element for free access through the various end openings such as 35 in the respective latch structures.

From the foregoing description, it will thus be evident that the present invention has provided a very simple and economical latch mechanism for pull lines wherein only a single integral member in combination with a cantilevered hook element is all that is required. Great reliability and economy of manufacture results and the various objects of the invention are thus fully realized.

What is claimed is:

1. A latch structure comprising: a guide means; a catch member mounted in a stationary position to said guide means; a hook element movably coupled to said guide means for movement along a path defined by said guide means into engagement with said catch member; means providing a biasing force biasing said hook element in an opposite direction along said path away from said catch member, said catch member defining a V shape tilted with respect to said path such that its outer apex faces said hook element and lies above said path and the ends of its arms lie below said path, said hook element having an elongated resilient portion cantilevered in the direction of said path with its free end bent to engage one arm of said V intermediate said outer apex and end of said one arm at a point above the level of the end of the other arm of said V, whereby said hook element is guided along said one arm to pass over said one end and be engaged in the inner vertex of said V to thereby hold said hook element to its drawn position, further pulling on said hook element resulting in said element riding over the end of said other arm and thereby being in a position free of said vertex for retraction back to its initial position by said biasing force.

2. A latch structure for latching a line including: a guide means defining a given path; a resilient hook element coupled to said guide means for movement along said given path in response to pulling of said line; means for providing a biasing force on said hook means opposing said pulling; a catch member stationarily mounted to said guide means in a given position along said path at a point at which it is desired to latch said line, said catch member having a first under sloping engaging surface merging into a return upper surface thence into a second under engaging sloping surface of less slope, and then into a second upper return surface to define a tilted V shape with the outer apex of said V facing said hook element above said path and the ends of the arms of said V below the level of said path, said hook element having an elongated forwardly extending portion cantilevered along the direction of said path with its free end bent to engage said first under sloping surface at a point above the level of the lower end of the second under sloping surface when moved along said path by pulling on said line, the bent free end riding down said first under surface around said lower end to be received in the inner vertex of said V shape when the pulling force on said line is relaxed, whereby said hook element holds said line in its extended pulled position, further pulling on said line causing said bent free end to ride down said second under sloping engaging surface around its lower end, relaxing of the pulling tension on said line then resulting in said bent free end riding up along said second return surface over said outer apex to thereby free itself of said catch member and return along said path as said line is retracted by said biasing force.

3. A latch structure according to claim 2, in which said catch member further includes a first opposing under sloping surface merging at its upper end into a second opposing sloping surface of less slope to define a smaller V-shaped projection with its outer apex extending into said inner vertex of said first-mentioned V shape such that said outer apex is positioned below and behind said lower end of said second under sloping engaging surface whereby said bent end is guided into said inner vertex upon relaxing of the tension in said line after said bent end has passed the lower end of said first under sloping engaging surface; and an end wall opposing said lower end of said second under sloping surface.

4. A latch structure according to claim 3, in which said end wall includes an opening positioned at the same level as the point of initial engagement of said bent end with said first under sloping engaging surface such that said line and hook element may be pulled past said catch member and engage a subsequent catch member positioned along said path.

5. A latch structure according to claim 2, in which said guide means includes an elongated track means defining said path; a guide structure coupled to said track means for movably mounting said hook element to guide the same along said track means; and a pulley mounted to said guide structure, said line being anchored at one end adjacent one end of said track means, said pulley and guide structure being normally biased by said means for providing a biasing force towards the other end of said track means, said line passing over said pulley with its free end returning towards said one end of said track means such that pulling on said line moves said pulley, guide structure and hook element along said path.

References Cited

UNITED STATES PATENTS

| | | |
|---|---|---|
| 1,114,675 | 10/1914 | Blomeen. |
| 1,509,780 | 9/1924 | Robertson. |
| 2,127,060 | 8/1938 | Hansen et al. _____ 74—527 |
| 2,671,354 | 3/1954 | Goos. |
| 2,982,149 | 5/1961 | Rentschler _____ 74—527 |
| 3,156,493 | 11/1964 | Griffiths. |

JAMES A. WONG, *Primary Examiner.*

FRED C. MATTERN, JR., *Assistant Examiner.*